Jan. 9, 1962

C. G. SEARS ETAL 3,016,203

CRUSHING AND SCREENING PLANT

Filed May 3, 1957

INVENTORS
Chester G. Sears
Grant J. Butterworth

BY

ATTORNEY

Jan. 9, 1962 C. G. SEARS ET AL 3,016,203
CRUSHING AND SCREENING PLANT
Filed May 3, 1957 7 Sheets-Sheet 4

INVENTORS
CHESTER G. SEARS
GRANT J. BUTTERWORTH
BY ATTORNEY

FIG. 5.

Jan. 9, 1962 C. G. SEARS ETAL 3,016,203
CRUSHING AND SCREENING PLANT
Filed May 3, 1957 7 Sheets-Sheet 6

FIG. 6.

INVENTORS
CHESTER G. SEARS
GRANT J. BUTTERWORTH
BY
ATTORNEY

FIG. 7.

INVENTORS
CHESTER G. SEARS
GRANT J. BUTTERWORTH
BY
ATTORNEY

United States Patent Office 3,016,203
Patented Jan. 9, 1962

3,016,203
CRUSHING AND SCREENING PLANT
Chester G. Sears and Grant J. Butterworth, Minneapolis, Minn., assignors to Poor & Company, Chicago, Ill., a corporation of Delaware
Filed May 3, 1957, Ser. No. 656,804
25 Claims. (Cl. 241—24)

This invention relates to a method and apparatus for crushing, screening and grading pit or quarry material, through the use of screens of different size mesh, into aggregates of selected sizes or grades ranging from a main product to be recovered through intervening stages to provide intermediate products and a terminal product such as sand.

Plants of the type set forth having the capacity to produce multiple aggregate products, may include by way of example, a top or first deck, a second or carry deck, a third, and a bottom or fourth deck, all of which decks are subjected to a vibrating or shaking movement so that the material will be classified in accordance with the size of the mesh and recovered as desired.

Apparatus of the type referred to may, as shown by Patent 2,276,333, dated March 17, 1942, include a primary or jaw crusher for reducing large particles and a secondary or roll crusher for reducing smaller particles, both mounted on a single chassis, and each intended for appropriately reducing the material not able to pass through the superimposed screens of the multiple deck by continually recirculating the material which is rejected or refused passage by the mesh of the product screens.

As an example of prior apparatus, it has been customary for the mesh of the screen on the third or feed deck, which receives the material directly from the pit conveyor, to be of a size to pass the first or main product to be recovered. Thus, the main product size material was screened out immediately but all material above the main product size including both secondary fines and coarser material was compelled to pass through the jaw crusher. In other words, in this arrangement, all material above the size refused passage by the main product size screen, including that which could be conveniently handled by the roll crusher was, discharged into the jaw crusher. This resulted in choking and thus reducing the efficiency of the jaw crusher because such material of reduced size occupied valuable space that would otherwise give higher production capacity to said jaw crusher.

Accordingly, one of the objects of the invention is to avoid the condition above-described and provide a multiple aggregate plant wherein the screens discharge selected products at different points from either the ends or the sides, and wherein a receiving screen constituting for example the third deck, is in part or throughout of a scalper mesh having the capacity to by-pass material oversized in relation to the first or main product, around the jaw crusher and into the re-circulating system to the top deck where it is fed back to the roll crusher.

Another object is to provide a multiple deck screen unit wherein each deck may employ screens of different size mesh, or the screen of a particular deck may be of the same mesh throughout. These arrangements make it possible to recover a greater range of products and also greatly increase the screening capacity while maintaining the decks within the practical physical limits of the length available. In other words, the present invention provides a screening plant that has higher capacities and more product sizes than are possible with conventional top feed type gravel plants.

A still further object is to provide a plant of maximum flexibility for obtaining multiple product sizes through the use of a four deck vibrating screen utilizing a unique spouting system, and in which the screens of the several decks are of different mesh and so arranged as to produce up to four product sizes simultaneously.

With the above and other objects in view which will more readily appear as the nature of the invention is better understood, the same consists in the novel construction, combination, and arrangement of parts hereinafter more fully described and illustrated in the accompanying drawings, in which:

FIGS. 2, 3 and 4 illustrate the use of a scalper mesh constituting a portion of the third or receiving deck, said scalping portion feeding "overs" to the jaw crusher.

Similar references designate corresponding parts throughout the several figures of the drawing. Where the several decks have similar screens, the same reference will be used, but, when a deck has screen sections of different mesh, the reference for a previously used section will bear an appropriate exponent, with a view to simplifying the description. Also, in all views the arrows on screens indicate the passage or flow of material through a screen; the dotted lines in the spouts and bins indicate product paths;

and the broken dash lines with arrows indicate the paths of embryo products being recirculated.

GENERAL DESCRIPTION

Referring to the drawings, all forms of the invention include a stack of vibratory screens disposed at different levels and adapted to feed material from a receiving end to a discharge end. The mounting and vibrating details are conventional and may vary within the industry.

In all of the figures of the drawing, the superimposed decks are designated as follows:

A at the top of the stack constitutes the top or first deck; the second deck B beneath A provides the so-called carry deck; the third deck C forms the third or receiving deck onto which the run of the pit material is dumped; the fourth or bottom deck is designated as D. The upper decks A and B together form a pair for handling only crushed material and the lower decks C and D form a pair for handling pit material.

Each of the decks A, B, C, D, with respect to each other, may be provided with sections of different mesh depending upon the product to be recovered at the stage of material processing. Also, each deck may comprise sections of different mesh.

Figure 8:
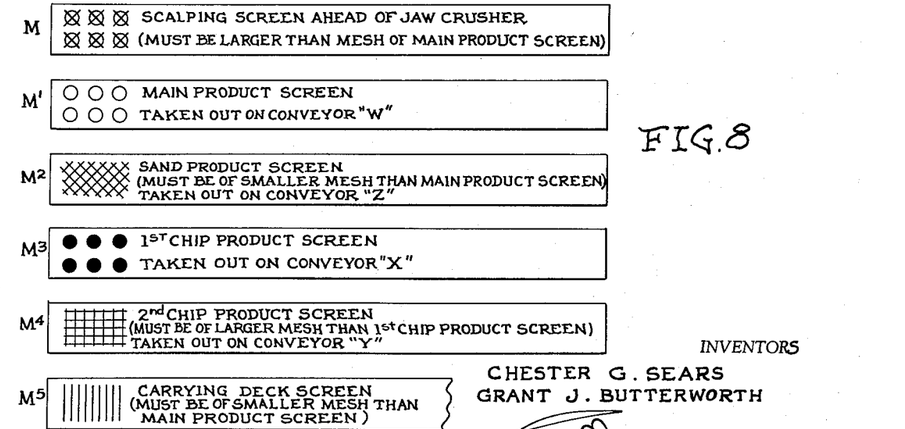
FIGURE 8 is a table illustrating diagrammatically six different screen mesh sizes by the use of symbols identifying the particular product to be recovered.
Figure 9:
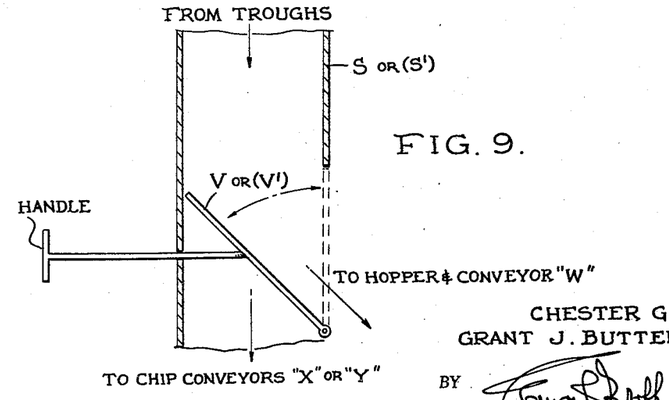
FIGURE 9 is a detail diagram of the chip damper arrangement.

By way of illustrating forms of different size mesh, reference may be made to the table in FIGURE 8 which designates screen mesh sizes by the letters M, M', $M^2$, $M^3$, $M^4$, and $M^5$.

As to the general structure involved, it will be seen that the second or carry deck B, in all forms of the invention, has lateral take-off troughs T and T' (FIG. 1) respectively between the screen sections and the end of one section of the deck for carrying product material, at its selected stage, into a spouting system including the chutes S and S', respectively. These chutes have dampers V and V' for directing the material either to a hopper Q' or to a related product conveyor W, X, Y. The troughs T and T' in the deck B are inclined and have their outlet ends disposed to discharge the opposite side edges of the deck into the chutes.

Figure 2:
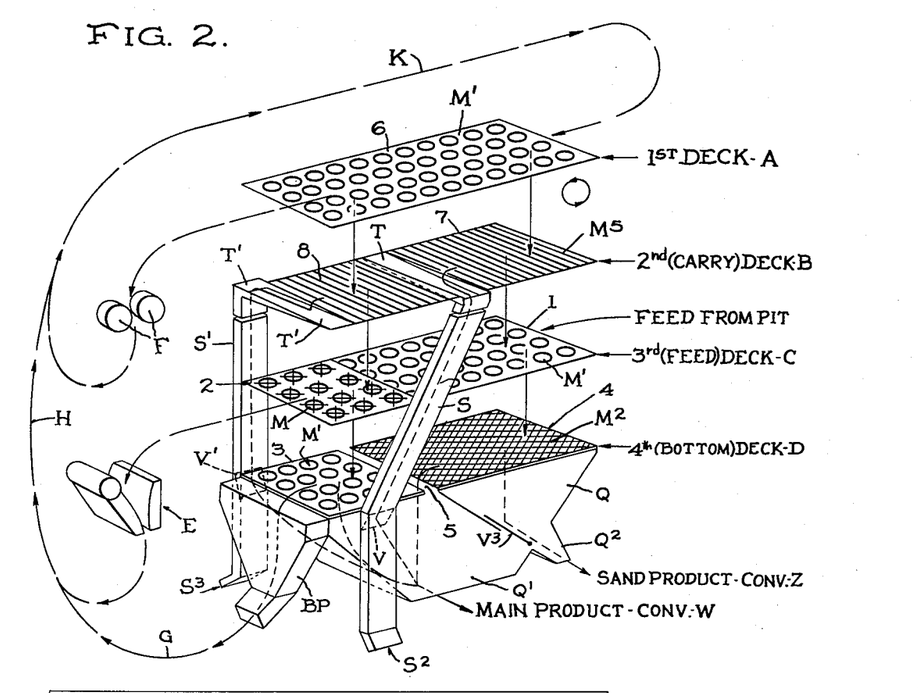
FIG. 2 is a diagrammatic view showing a multiple deck and screen arrangement for recovering a main product and a second product such as sand.
Figure 3:
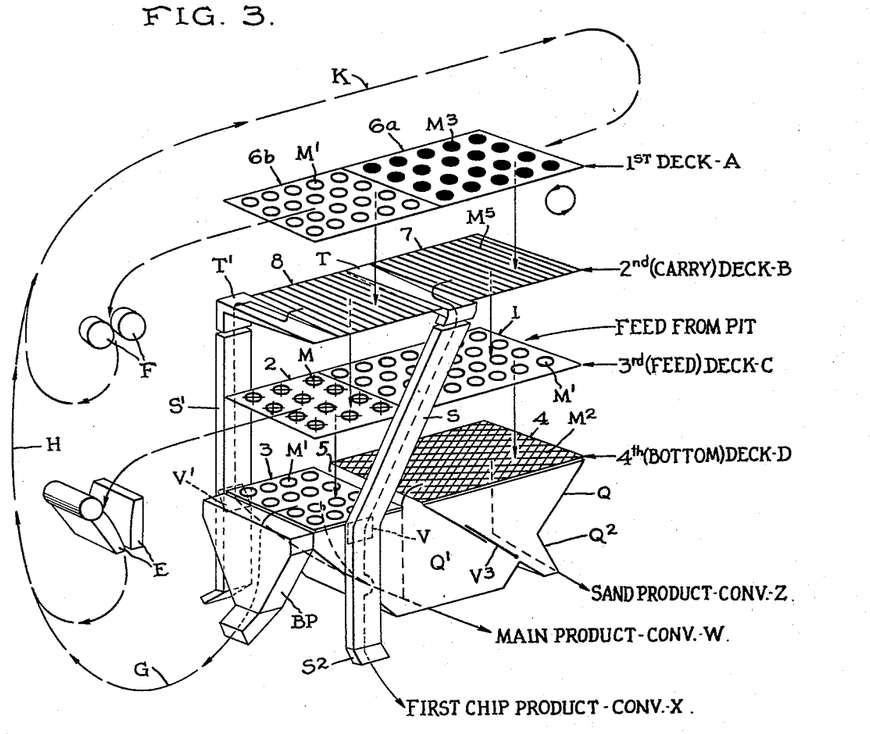
FIG. 3 is a diagrammatic view showing a multiple deck and screen arrangement for recovering three products such as a main product, a first chip product, and a third product such as sand.
Figure 4:
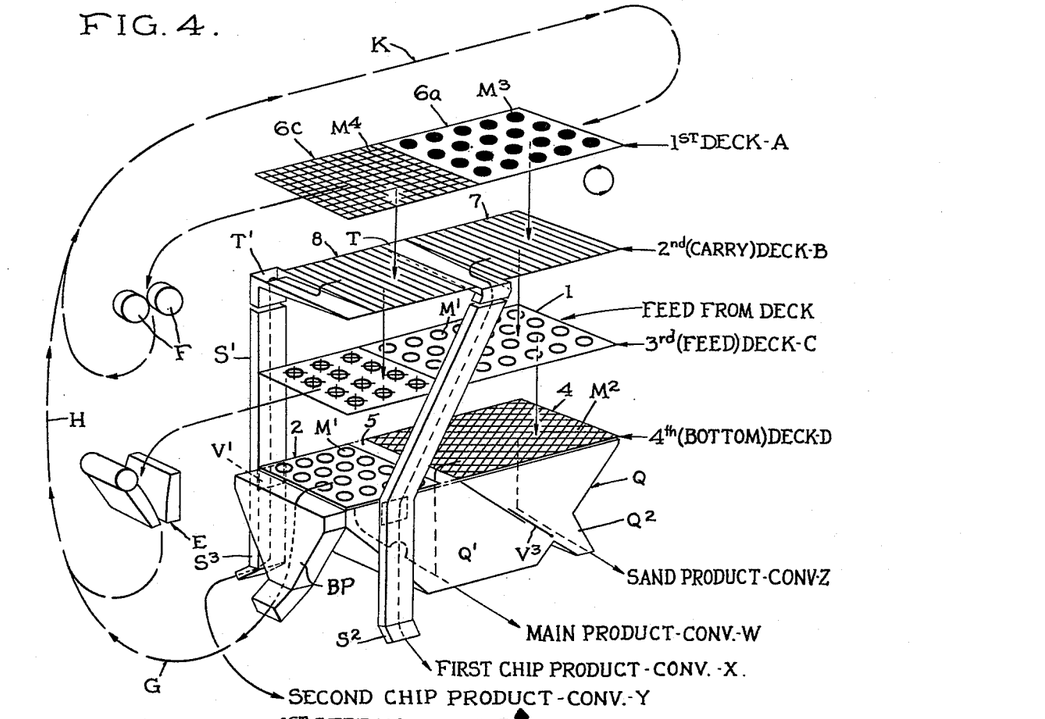
FIG. 4 is a diagrammatic view showing a multiple deck and screen arrangement for recovering four products, namely, a main product from the pit run, a first chip product as a result of a crusher run, a second chip product as a result of a crusher run, and a fourth product such as sand.

Also, as will be observed from FIGURES 2, 3 and 4, the bottom deck D has its screen sections separated by cross gaps which permit recoverable product material to drop to the point of collection.

As previously indicated, the decks may be of different length, or they may be of the same overall length. Depending on the particular operation, a given deck may have a screen section of the same mesh throughout or it may have sections of different mesh size.

The system of material handling provided herein additionally includes a primary reduction element which may be a jaw crusher located substantially midway of the plant.

The jaw crusher E performs the function of breaking up the relatively larger pieces of rock which need further reduction, and, in accordance with the principal object of the invention, its efficiency is increased substantially in practice by diverting therefrom a stream of material of a size between a selected product size and a larger product size.

Both jaw crusher E and roll crusher F discharge onto a conveyor G which performs the initial stage of returning the material for recirculation to the mesh of the first deck A. The conveyor G communicates through transfer means H with the upper return conveyor K which discharges onto the top deck A. From this point all material passes over or through the screen mesh of decks A, B, C, D, until the desired products are recovered.

The receiving deck C is supplied with a *first* stream of pit run material by an elevating conveyor L, and this stream is divided in a manner about to be described into four additional processing streams, making a total of five streams in all.

Figure 10:
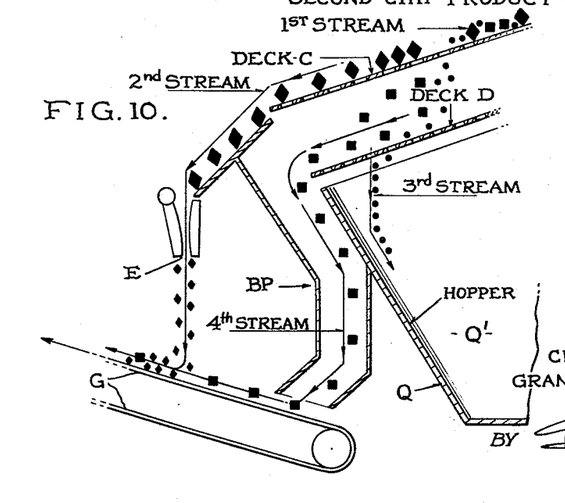
FIGURE 10 is a detail diagram of the by-pass chute.

For example, the aforesaid *first* stream, as shown in FIG. 10, on the same sheet as FIG. 4, is divided by deck C into three additional processing streams, namely, a *second* stream containing oversize rocks requiring further reduction by the first or jaw crusher E, a *third* stream containing a main product to be recovered, and a *fourth* stream which is by-passed around the jaw crusher E because it contains material of a size which is too coarse in relation to the size of the quickly recoverable product of said *third* stream, but so fine that it would impede the reduction of the entrained large rock of the *second* stream, normally passing into the jaw crusher E. The *fifth* stream is constituted by the recirculated material from deck A which is fed back to the *second* or roll crusher F after having passed completely over deck A and back into the recirculating system which includes the roll crusher F.

Of the streams now identified and described, the *third* and *fourth* streams, can be advantageously further described as follows:

The *third* stream, contains the main product to be recovered, that is the product of a size which, for example, is to be used in the greatest quantity in a given operation. This product may be appropriately defined as "quickly recoverable" because such product is obtained from the raw material fed to deck C without crushing and the delay incident to re-circulating. In other words, the product does not require further processing or recirculation for treatment by either the first or jaw crusher or the second or roll crusher, and therefore becomes quickly available for use.

The *fourth* stream, by-passed around the jaw crusher, contains a mixture of relatively fine and oversize material, and, because of the removal of this mixture the jaw crusher is maintained at its full efficiency in the respect that the breaking up of relatively large rock requiring jaw crusher action; for reduction to specifically useful recoverable product sizes; is not hampered by packing or clogging induced by trapped finer material.

Figure 1:
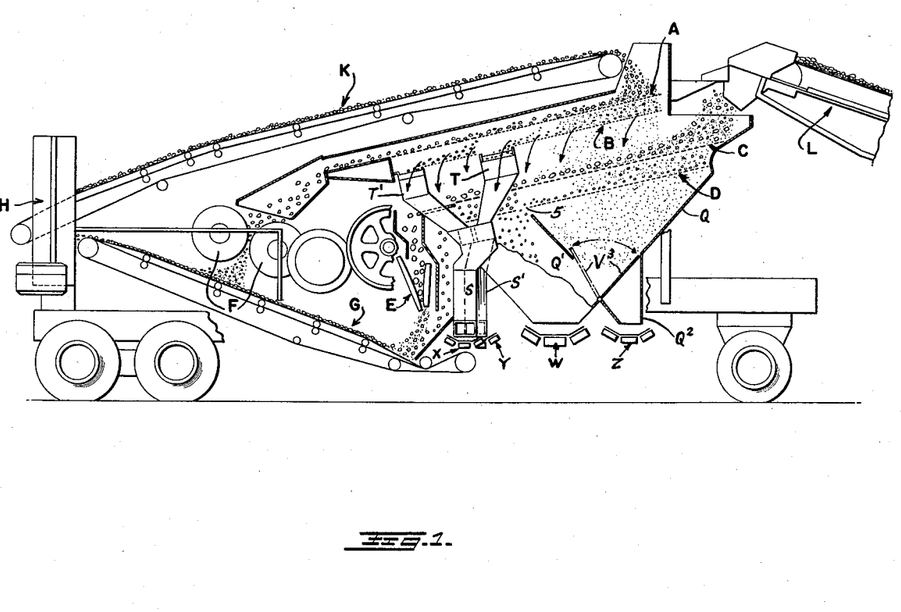
FIG. 1 is a diagrammatic vertical cross sectional view of a mobile type apparatus embodying a multiple screen deck arrangement and showing the relation of the decks to the primary or jaw crusher, the secondary or roll crusher and re-circulating conveyor system.

It will now be seen that, the materials from decks A, C and D containing oversize and intermediate products which are returned by the conveyor means G, H, K, for another pass through the system, include as shown in FIGURE 1, the second stream or all parts of the pit run material which are oversized for the mesh for receiving deck C, and which may be further reduced by jaw crusher E; and the fourth stream or, those parts which are "throughs" form the lower edge of screen deck C, but are too coarse to pass through the main product mesh of the trailing section of screen deck D, and which are so relatively fine that if they pass through the jaw crusher with larger rock, they tend to collect about such rock, so that the jaw crusher becomes clogged or choked, thereby reducing its efficiency. The second and fourth streams including respectively, the product from deck C and the intermediate material which by-passes the jaw crusher, as shown in FIGURE 1, along with the aforesaid fifth product stream discharged from roll crusher F are carried by the conveyor means G, H, and K back to the top deck A.

Material which is too coarse to pass through the deck A, and, which as it will be seen, is not now appropriate for the jaw crusher E, will re-enter the circulation system as the aforesaid fifth stream to the roll crusher F, to be further reduced to the desired product sizes and again returned through conveyors G, H, K, to pass through appropriate screens in decks A, B, C and D.

It will, of course, be understood that the crushers, conveyors and screens are all driven in a conventional manner by suitable drives from one or more motors, well known in the industry. Though the invention, as shown, is a portable unit, it will be understood that the same may be embodied in a stationary plant with equal facility.

The flexibility of the screen arrangement is wide and varied in its execution as will appear from the examples now to be described.

The foregoing general description being applicable to FIG. 1 may be conveniently designated as "Example I."

*Example II*

Referring to FIGURE 2 it will be observed that the pit run material is dumped by conveyor L onto the third deck C as a single stream where it is divided into two major streams, one of which, the second product stream FIGURE 10 goes direct to the jaw crusher E, while the other or third stream contains the main product to be recovered and to be deposited on the conveyor W. A sand product is separated in this case from the main product for deposit on the conveyor Z.

The deck C is provided with a screen section 1 having a mesh M′ to pass a main product to be recovered, while the deliver end or scalping section 2 of mesh M has its leaving edge discharge the material refused passage directly to the jaw crusher E where it is broken up and fed to the conveyor G for recirculation. The material passing through section 2 of deck C is retained on section 3 of the bottom deck and is directed into the by-pass chute BP for deposit on the lower conveyor G also to be recirculated. The material by-passing the jaw crusher is that heretofore identified as the intermediate material which constitutes the fourth stream.

The third stream containing the quickly recoverable main product and its sub-product, sand, will fall onto the initial section 4 of the bottom deck D. The sand product will then pass through the mesh $M^2$ of section 4 into the main compartment hopper Q whose valve $V^3$ is positioned to close the secondary compartment and divert the sand through spout $Q^2$ to the conveyor Z.

The main product held on section 4 of the bottom deck falls off the leaving edge of said section 4 and through gap 5 into the compartment Q′ where it may be collected and deposited on the conveyor W.

Any main product size passing through the trailing section 2 of deck C will pass through the scalping mesh M and fall onto section 3 of bottom deck D where it will pass through mesh M′ also into compartment Q′. On the other hand, any particles which constitute the designated intermediate size, namely those which are greater than main product size on section 3, but are so relatively fine that if they pass through the jaw crusher which reduces its efficiency, as previously explained, are deposited in the by-pass chute BP and onto the conveyor G for recirculation.

It will now appear that the recirculating conveyor system G, H, K, receives material from by-pass BP, jaw crusher E and roll crusher F, the upper conveyor K depositing all of its material on the first deck A having a single screen 6 of main product size mesh M′. Material too large to pass through mesh M′, that is the "overs" will drop off the leaving end of screen 6 into the second or roll crusher F for further reduction before being returned to the recirculating system. All main product size (or "throughs") will pass through screen 6 onto the screen sections 7 and 8 of second deck B whose screen $M^5$ is of smaller mesh than the main product screen to pass sand through section 1 of deck C and through section 4 of deck D and into the said compartment of the hopper Q. Main product particles collecting on screen section 7 of deck B will drop into the first trough T and be conducted through the first spout S into the compartment Q′ because the valve V is set to divert the material into the hopper instead of through the outer exit end of the spout.

Similarly, main product size material on section 8 of the deck B will fall into second trough T′ and through second spout S′ where it will encounter valve V′ to also divert the main product into the compartment Q′.

*Example III*

FIGURE 3 illustrates an arrangement of screens in the several decks which will enable the recovery of the main product for conveyor W, a first chip product for conveyor X and a sand product for conveyor Z.

The only structural difference between FIGURE 3 and FIGURE 2 resides in the top deck A and the positions of valve V.

In FIGURE 2 the screen throughout has uniform mesh M′ but in FIGURE 3 the deck A has sections $6^a$ and $6^b$, the first mentioned section having mesh $M^3$ of a size to recover a first chip product to be taken out on conveyor X while the section $6^b$ is provided with mesh M′ to recover a main product for deposit on conveyor W.

The single stream of pit run material deposited on feed deck C will produce the main product for conveyor W, and the sand product for conveyor Z in the same manner as described in FIGURE 2. However, due to the difference in initial section $6^a$ of deck A, the mesh $M^3$ thereof will deposit first chip product size onto section 7 of deck B and such product will be dropped into trough T and be carried through spout S directly out the end $S^2$ thereof to the first chip product conveyor X because the valve V is turned to block off the compartment Q′.

Main product material collected on trailing section 8 of deck B will pass through spout S′ whose valve V′ is left as it was in FIGURE 2 to divert the main product into chamber Q′.

Accordingly, it will be understood that by changing the mesh of screen sections in the deck A, a third product may be recovered.

*Example IV*

FIGURE 4 illustrates a further alteration of the screen sections in the deck A to recover a fourth product namely a second chip product for conveyor Y.

In this arrangement the main product, the first chip product and the sand product are recovered in the same manner as described in FIGURE 3, but, because the trailing screen section $6^c$ of deck A is provided with mesh $M^4$ which controls recovery of the second chip product, such product drops onto the section 8 of deck B and falls into trough T′ which communicates with chute S′ where said second chip product makes its exit through the mouth $S^3$ of spout S′ because the valve V′ is positioned as in FIGURE 4 to block off entrance to the large main product compartment Q′.

*Preface to Examples V, VI AND VII*

Figure 5:
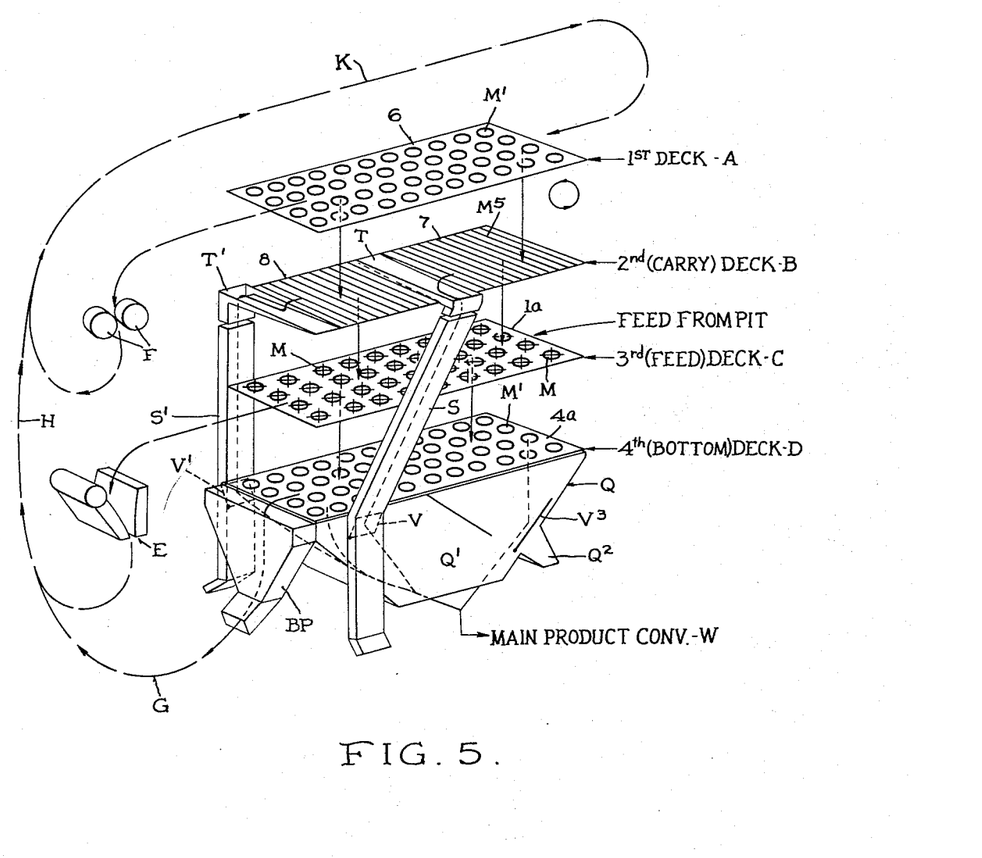
FIG. 5 is a diagrammatic view showing a multiple deck and screen arrangement for recovering a main product as a result of a pit and crusher run.
Figure 6:
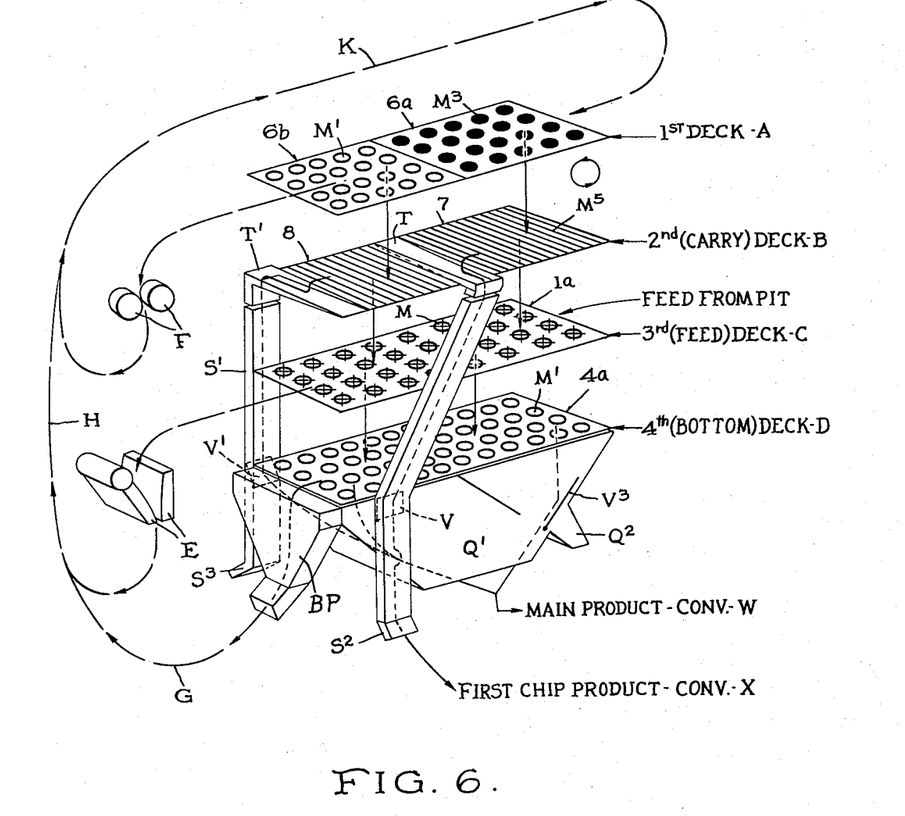
FIG. 6 is a diagrammatic view showing a multiple deck and screen arrangement for recovering a main product as a result of a pit and crusher run and a first chip product as a result of a crusher run.
Figure 7:
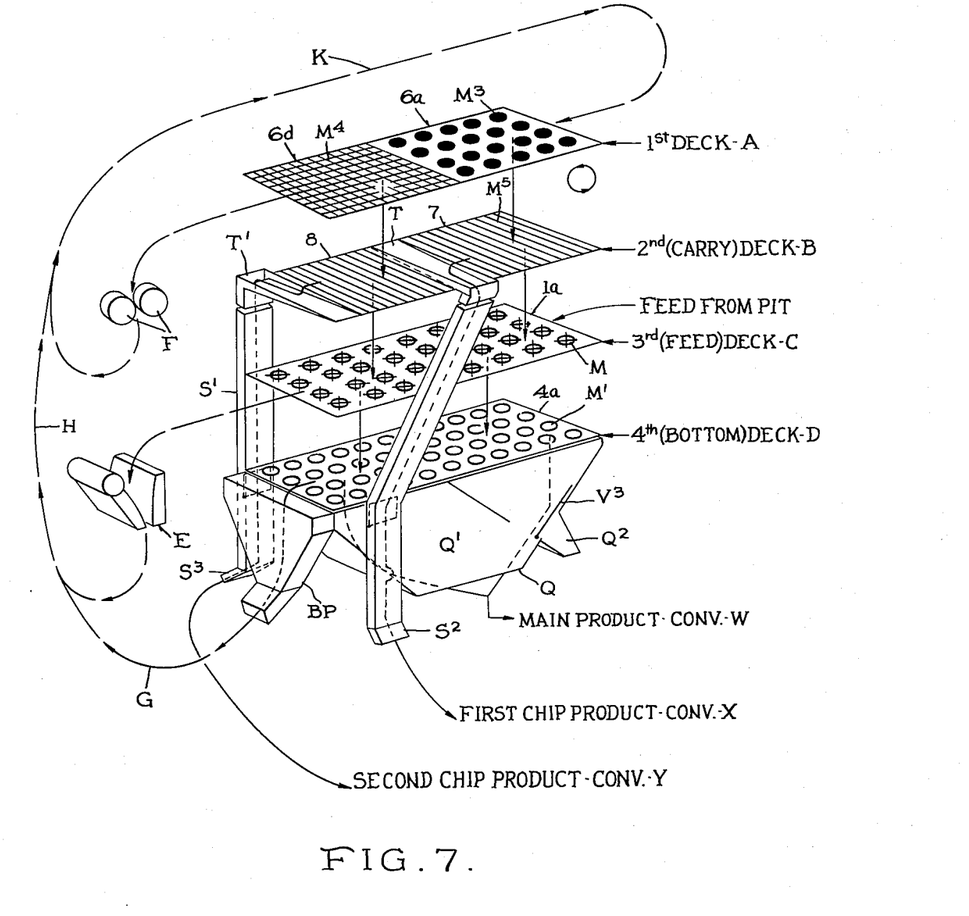
FIG. 7 is a diagrammatic view showing a multiple deck and screen arrangement for recovering a main product as a result of a pit run, a first chip product as a result of a crusher run and a second chip product also the result of a crusher run. The group of FIGS. 5, 6 and 7 illustrate the third or receiving deck as being of a scalper mesh throughout its length, the leaving end of the trailing portion discharging to the primary or jaw crusher.

This group of figures will be described as detail examples, but at this point it seems appropriate to point out that FIGURES 5, 6 and 7 illustrate screening arrangements for recovering a single main product for the conveyor W as in FIGURE 5; two products in FIGURE 6, namely, a main product for conveyor W and a first chip product for conveyor X; while FIGURE 7 recovers three products, namely, a main product for conveyor W, a first chip for conveyor X and a second chip product for conveyor Y. In this general arrangement it is not intended to recover sand and, therefore, the damper $V^3$ in all figures of this group remains in position to close off spout $Q^2$ of the hopper so that no product passes therefrom.

*Example V*

According to FIGURE 5, an arrangement is illustrated wherein only a main product is delivered to the conveyor W, the receiving deck C has a single screen $1^a$ directly to the jaw crusher E. All main product size material which passes through $1^a$, as shown by the arrows, onto the single section $4^a$ of deck D also passes through openings M′ of said section into the main compartment of hopper Q whose valve $V^3$ has its sand outlet spout closed as previously explained. All material which is too coarse for the main product size, but so fine that it would choke the jaw crusher if it went along with material from deck C is by-passed through the chute BP to the conveyor G.

Referring further to FIGURE 5 it will be seen that any recirculated material from conveyor K onto screen 6 of deck A having mesh M' will immediately cause the main product size particles to fall onto deck B. In this case the main particles fall as the arrows show, to the screen sections 7 and 8 of deck B. Oversize main products from section 7 will pass into trough T and thence into the first chute S whose damper V' is positioned so as to throw the main product into the main compartment Q' of the hopper.

Also, main product material falling on section 8 of the carry deck will pass into the second chute S' whose damper V' is positioned to throw the main product into the main compartment Q'.

Example VI

Whereas FIGURE 5 recovers only a main product, FIGURE 6 is intended to provide an arrangement wherein an additional product, namely a first chip product is contained for the conveyor X.

The first deck A is provided with a section $6^a$ having first chip size mesh $M^3$ and a trailing section $6^b$ having main product size mesh M' (like FIG. 3).

The screen decks B, C and D have the same mesh screens shown in FIGURE 5.

Recirculated material deposited on initial section $6^a$ of deck A screen out the first chip product material and deposits the same on the section 7 of deck B whereupon it falls into the first trough T, down first chute S to its exit end $S^2$ because the damper V blocks off entrance to the main product hopper compartment Q'.

The main product screened by the trailing section $6^b$ of deck A falls onto the section 8 of deck B and passes through second trough T' into second spout S' where the damper B' is set to divert the main product into compartment Q'.

Example VII

FIGURE 7 illustrates a screening arrangement which will provide for the recovery of three products, namely a main product for conveyor W, a first chip product for conveyor X, and a second chip product for conveyor Y.

It is to be noted that the deck A is provided with an initial section $6^a$ having first chip product screen mesh $M^3$ and a trailing section $6^d$ having second chip product screen mesh $M^4$. The decks B, C and D are the same as in FIGURES 5 and 6.

When pit run material is fed onto deck C, the recovery cycle for the main product and the first chip product is the same as in FIGURES 5 and 6.

However, due to the fact the trailing section $6^d$ of deck A has the second product chip screen mesh $M^4$, said product falls onto section 8 of deck B and falls into second trough T where it is conducted into the second chute S' and led out the lower end $S^3$ thereof to be deposited on the second chip product conveyor Y.

It will now be seen that in the examples constituting the group of FIGURES 5, 6 and 7, the screen arrangement of deck A is such that a given recirculated product can be treated and recovered as a usable product. Also, in all of these arrangements the main product is recovered from a single screen constituting the bottom deck D and having mesh M' and substantially directly recovering the main product from pit run material.

In all of the illustrated forms of the invention, it is possible to screen out one or two products from the pit run material, while at the same time, separating or singling out the intermediate material between the jaw crusher embryo product size and the main product size to accomplish the objective of maintaining maximum capacity and efficiency of the jaw crusher in the recirculating system.

We claim:

1. A method of continuously recovering classified aggregates of different sizes in a recirculating conveyor system including, first and second crushers, which consists in, passing pit run material over a first screen to separate said pit run material into a relatively fine material and a coarse material, feeding said coarse material direct to the first crusher, screening the throughs from the first screen to divide out a quickly recoverable product and an intermediate product too coarse for said quickly recoverable product but so fine as to impair the efficiency of the first crusher and requiring further processing, by-passing the intermediate product around the first crusher, and returning said intermediate product into the recirculating system for subsequent reduction by the second crusher and further screening.

2. A crushing and screening plant of the multiple deck type, comprising; a recirculating conveyor system including a first crusher and a second crusher; a hopper having communicating valve controlled main product and sand compartments; a material classifying unit including a top deck having mesh to screen material deposited thereon by the recirculation system; a carry deck having mesh smaller than main product size and divided into initial and trailing sections separated transversely by troughs discharging at their outer opposite ends into chutes provided intermediate their receiving and exit ends with valve means for selectively controlling material flow of oversize from the carry deck to said hopper or out the exit ends thereof; a feed deck receiving pit run material and having an initial section of main product size mesh and a trailing section of slightly larger size mesh than the initial section and whose discharge end directs oversize products above an intermediate product size into the first crusher; and a bottom deck between the feed deck and the hopper and including an initial section of a mesh to pass sand only into said sand compartment of the hopper and a trailing section spaced downstream of the initial section to provide a gap permitting main product size material to fall through said gap from the sand mesh section into the main product compartment of the hopper, said trailing section having main product size mesh permitting main product size material to pass therethrough and refusing passage to material of a size intermediate main product size mesh and the larger size mesh, and a by-pass chute receiving discharge from the trailing section of the bottom deck and conducting said intermediate material to the recirculating conveyor system.

3. A crushing and screening plant according to claim 2, wherein, the top deck has as throughs a main product size mesh for passing main product size material to the carry deck.

4. A crushing and screening plant according to claim 2, wherein, the top deck is provided with an initial screen section of first chip product mesh size which discharges throughs onto the initial section of the carry deck, the oversize from this initial section discharging into the first trough communicating with the first chute whose valve is positioned to block communication to the main product compartment of the hopper so that the first chip product may proceed out the exit end of said chute; and the trailing section of the top deck is provided with main product size mesh which permits main product material to fall on the trailing section of the carry deck and the oversize from this final section discharging into the second trough communicating with the second spout whose valve is set to divert main product size material into the main product compartment of the hopper.

5. A crushing and screening plant according to claim 2, wherein, the top deck is provided with an initial screen section to pass as throughs a first chip product to the initial section of the carry deck and the said first chip product as oversize from this initial section discharges into the first trough communicating with the first chute whose valve is positioned to block communication with the main product compartment of the hopper so that the first chip product can pass out the exit end of the chute; and the trailing section of the top deck is provided with a mesh of a size to pass a second chip product material to the trailing section of the carry deck and as oversize from the trailing section into the second trough communicating with the second related chute whose valve is positioned to block off communication with the main product compartment of the hopper and permitting the second chip product to pass as a separate finished product out of the exit end of the second chute.

6. A crushing and screening plant of the vertically spaced multiple deck type, comprising, a recirculating conveyor system including a jaw crusher and a roll crusher, a hopper having main and secondary compartments and valve means for selectively opening and closing one relative to the other, a material classifying unit comprising a top deck having screen mesh in receiving relation to the recirculating system; a carry deck below the top deck and including initial and trailing sections separated by first and second troughs discharging at opposite edges thereof, first and second chutes in receiving relation to the discharge end of each trough and each chute having a valve between its exit end and its receiving end, said valve controlling communication between the chute and the main compartment of the hopper and the exit end of the chute, a feed deck for receiving pit run material and having scalper size mesh throughout discharging directly to the jaw crusher; and a bottom deck between the hopper and the feed deck and having main product size mesh throughout and with its discharge end communicating with a by-pass chute leading to the recirculating system.

7. A crushing and screening plant according to claim 6, wherein, the top deck is provided with main product size mesh throughout, and the valves in the chutes are set to discharge the main product into the main product compartment of the hopper and the valve between the main compartment and the secondary compartment is opened and the hopper discharge chute is closed to divert main product material from the bottom deck into the main product compartment.

8. A crushing and screening plant according to claim 6, wherein, the top deck is provided with an initial section of first chip product size to screen out said product from the recirculated material and deposit it on the initial section of the carry deck and into the first spout whose valve is set to block off the main product compartment of the hopper to recover a first chip product out of the exit of said first spout; and the trailing section of the top deck is provided with main product size mesh to pass main product to the trailing section of the carry deck and into the second trough and the second chute whose valve is set to establish communication with the main product compartment of the hopper.

9. A crushing and screening plant according to claim 6, wherein, the top deck has an initial section of a mesh to pass a first chip product to the initial section of the carry deck for recovery through the first trough and first chute; and the trailing section of the top deck is provided with a second chip product size mesh to pass the same to the trailing section of the carry deck and through the second chute to its exit end for recovery.

10. A crushing and screening plant, including, in combination, top, carry, feed, and bottom vertically spaced screen decks, first and second crushers communicating with a recirculating conveyor system for supplying said top deck and the remaining decks with recirculated material, a compartmented hopper beneath the bottom deck, a by-pass chute having one end in receiving relation to the material leaving the end of said bottom deck and discharging into said recirculating system, and transverse troughs dividing the second carry deck into two sections, said troughs having ends discharging at opposite sides of the deck, product delivery chutes at opposite sides of the decks and having their mouth portions in receiving relation to the discharge ends of the troughs, and a product diverting valve in each chute.

11. A crushing and screening plant according to claim 10, wherein the top screen deck receives material to be further reclassified from the recirculating conveyor system, and passes throughs to the carry, feed, and bottom decks while the leaving end of said top deck discharges "overs" to the second crusher which again returns the material reduced thereby to said recirculation system for classification by the top deck.

12. A crushing and screening plant according to claim 10, wherein the top deck is provided with a mesh to pass a main product size to said hopper.

13. A crushing and screening plant according to claim 10, wherein the carry deck is provided with two screen sections of substantially the same mesh, said mesh being smaller than product size mesh in the top deck.

14. A crushing and screening plant according to claim 10, wherein the feed deck is provided with mesh to pass a main product size and to discharge material substantially above said main product size to the first crusher.

15. A crushing and screening plant according to claim 10, wherein, the bottom deck is provided with mesh to pass material to said hopper and also by-pass material around the first crusher and into the recirculating system.

16. A crushing and screening plant, according to claim 10, wherein the top deck has initial and trailing sections of different mesh.

17. A crushing and screening plant according to claim 10, wherein the top deck has a single screen of the same size mesh throughout.

18. A crushing and screening plant according to claim 37, wherein the top deck is provided with main product size mesh throughout, and the valve in one chute is set to discharge the main product into the main product compartment of the hopper and the valve in the other chute is also set to divert additional main product into the main product compartment.

19. A crushing and screening plant according to claim 10, wherein the top deck is provided with an initial section of first chip product size to screen out said product from the recirculated material and to deposit it on the initial section of the carry deck and direct it into the chute whose valve is set to block off the main product compartment of the hopper to recover a first chip product; and the trailing section of the first deck is provided with main product size mesh to pass the main product to the trailing section of the carry deck and into the second trough and the second chute whose valve is set to establish communication with the main product compartment of the hopper.

20. A crushing and screening plant according to claim 10, wherein, the hopper has main and secondary compartments controlled by a related valve, and the feeding deck has mesh of uniform size throughout discharging directly to the first crusher and the bottom deck has main product size mesh throughout and with its discharge end communicating with said by-pass chute.

21. A crushing and screening plant according to claim 10 wherein the top deck has an initial section of a mesh to pass a first chip product to the initial section of the carry deck for recovery through the first trough and first chute; and the trailing section of the top deck is provided with a second chip product size mesh to pass said second chip to the trailing section of the carry deck and through the second chute to its exit end for recovery.

22. A crushing and screening plant according to claim 10, wherein the feed deck has initial and trailing screen sections of different mesh.

23. A crushing and screening plant according to claim 10, wherein the feed deck has a single screen of the same mesh throughout.

24. A crushing and screening plant according to claim 10, wherein the bottom deck has an initial screen section of a given mesh and a trailing section of a coarser mesh, said sections having adjacent edges spaced apart to provide a gap to release product material screened by said initial section for useful recovery.

25. A crushing and screening plant according to claim 10, wherein the bottom deck has a single screen of uniform size mesh throughout its length.

References Cited in the file of this patent

UNITED STATES PATENTS

| | | |
|---|---|---|
| 1,491,096 | Hicken | Apr. 22, 1924 |
| 1,505,573 | Mayhew | Aug. 19, 1924 |
| 2,276,333 | Overstrud | Mar. 17, 1942 |
| 2,461,089 | Smidth | Feb. 8, 1949 |
| 2,593,353 | Shelton | Apr. 15, 1952 |
| 2,864,561 | Mork | Dec. 16, 1958 |

FOREIGN PATENTS

| | | |
|---|---|---|
| 22,869 | Sweden | Aug. 3, 1907 |
| 211,002 | Great Britain | Feb. 14, 1924 |
| 451,104 | Germany | Oct. 21, 1927 |

OTHER REFERENCES

One Unit Crushing and Screening Plant, Rock Products, October 1944, pages 60–61.